United States Patent
Shimizu (10) Patent No.: US 10,084,259 B1
(45) Date of Patent: Sep. 25, 2018

(54) WATERPROOF COMPONENT

(71) Applicant: Yazaki Corporation, Tokyo (JP)

(72) Inventor: Isanori Shimizu, Shizuoka (JP)

(73) Assignee: YAZAKI CORPORATION, Minato-ku, Tokyo (JP)

( * ) Notice: Subject to any disclaimer, the term of this patent is extended or adjusted under 35 U.S.C. 154(b) by 0 days.

(21) Appl. No.: 15/922,998

(22) Filed: Mar. 16, 2018

(30) Foreign Application Priority Data

Mar. 27, 2017 (JP) ................................ 2017-061163

(51) Int. Cl.
*H01R 13/627* (2006.01)
*H01R 13/52* (2006.01)

(52) U.S. Cl.
CPC ....... *H01R 13/521* (2013.01); *H01R 13/5213* (2013.01); *H01R 13/5219* (2013.01); *H01R 13/6273* (2013.01)

(58) Field of Classification Search
CPC .............. H01R 13/521; H01R 13/5213; H01R 13/5219; H01R 13/6273
USPC .................................................. 439/353–357
See application file for complete search history.

(56) References Cited

U.S. PATENT DOCUMENTS

| 7,390,199 B2 * | 6/2008 | Honda | H01R 12/57 439/78 |
| 7,727,020 B2 * | 6/2010 | Gladd | H01R 13/521 439/589 |
| 8,272,895 B2 * | 9/2012 | Park | H01R 13/521 439/587 |

FOREIGN PATENT DOCUMENTS

JP 2015-099719 A 5/2015

* cited by examiner

*Primary Examiner* — Khiem Nguyen
(74) *Attorney, Agent, or Firm* — Sughrue Mion, PLLC (57) ABSTRACT

A waterproof component includes a housing body, a mat seal, and a mat seal cover. The housing body includes an attachment-hole-insertion portion having a mat-seal-accommodating chamber, an abutting portion configured to abut a first peripheral surface of the attachment hole, a locking claw provided on an insertion tip side of the attachment hole insertion portion, the locking claw to be locked to a second peripheral surface of the attachment hole, and a cover locking portion provided on an insertion tip side of the attachment-hole-insertion portion. The mat seal has an electric wire press-fitting hole. The mat-seal-accommodating chamber accommodates the mat seal. The mat seal cover locks to the cover-locking portion, the mat seal cover interposes the mat seal between the mat seal cover and a bottom wall of the mat-seal-accommodating chamber. The cover locking portion protrudes from the locking claw in an insertion direction toward the attachment hole.

2 Claims, 10 Drawing Sheets

WATERPROOF COMPONENT

CROSS REFERENCE TO RELATED APPLICATIONS

This application claims the priority of Japanese Patent Application No. 2017-061163, filed on Mar. 27, 2017, the entire content of which are incorporated herein by reference.

BACKGROUND

Technical Field

The present invention relates to a waterproof component for preventing water from entering various devices in which electric wires are routed over a wet area and a waterproof area.

Related Art

When electric wires are routed over a wet area and a waterproof area, such as a control device disposed in an engine room of an automobile, waterproof components attached to the electric wires prevent water from entering various devices where the electric wires are routed.

Techniques related to such a waterproof component are proposed in JP 2015-99719 A.

SUMMARY

Figure 8:
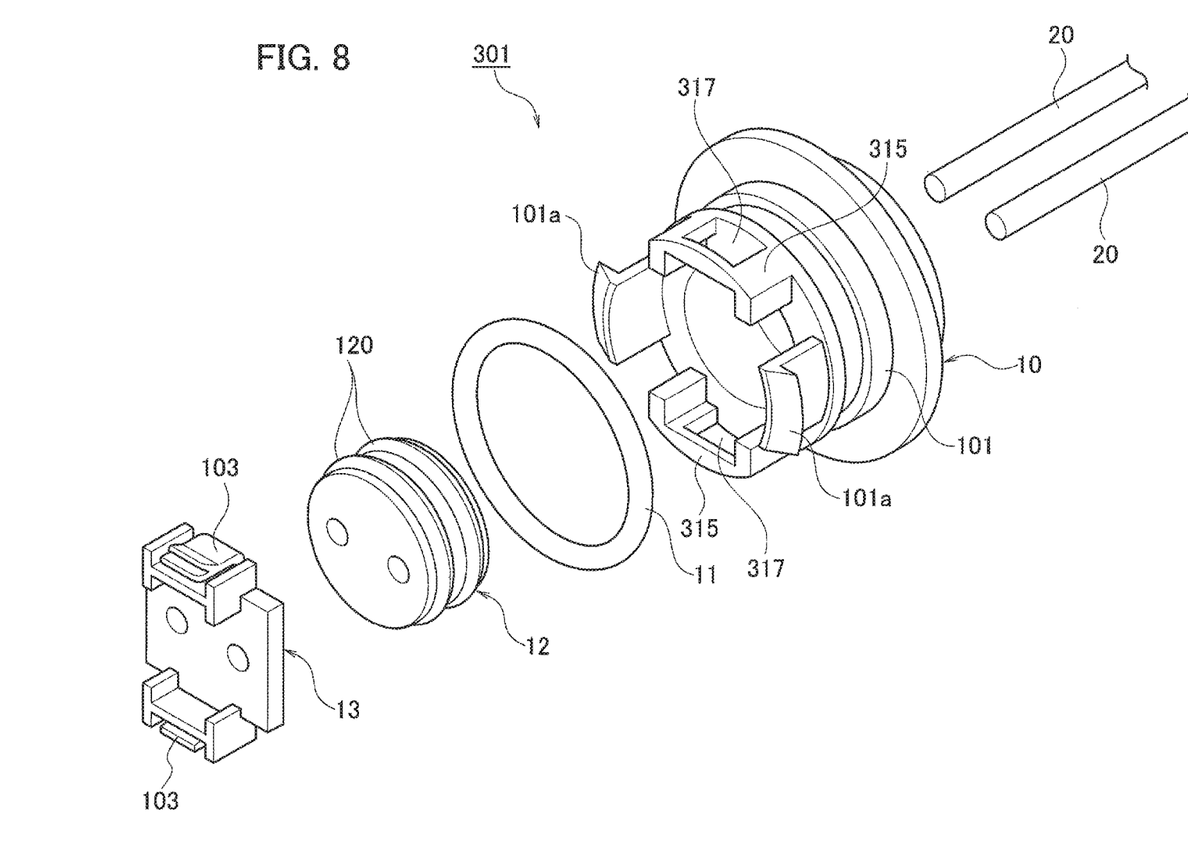
FIG. 8 is an exploded perspective view showing a configuration example of a waterproof component according to the reference example.
Figure 9A:
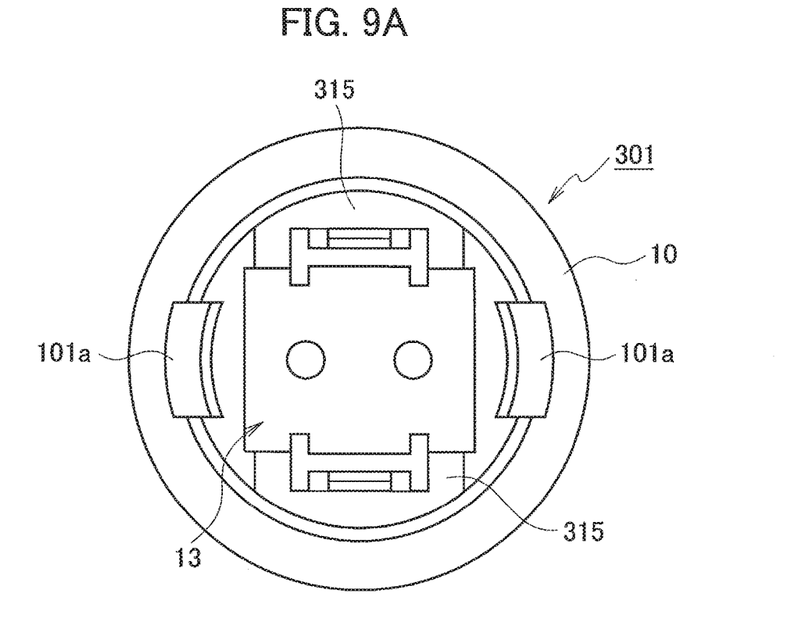
FIG. 9A is a front view showing a configuration example of a waterproof component according to the reference example.
Figure 9B:
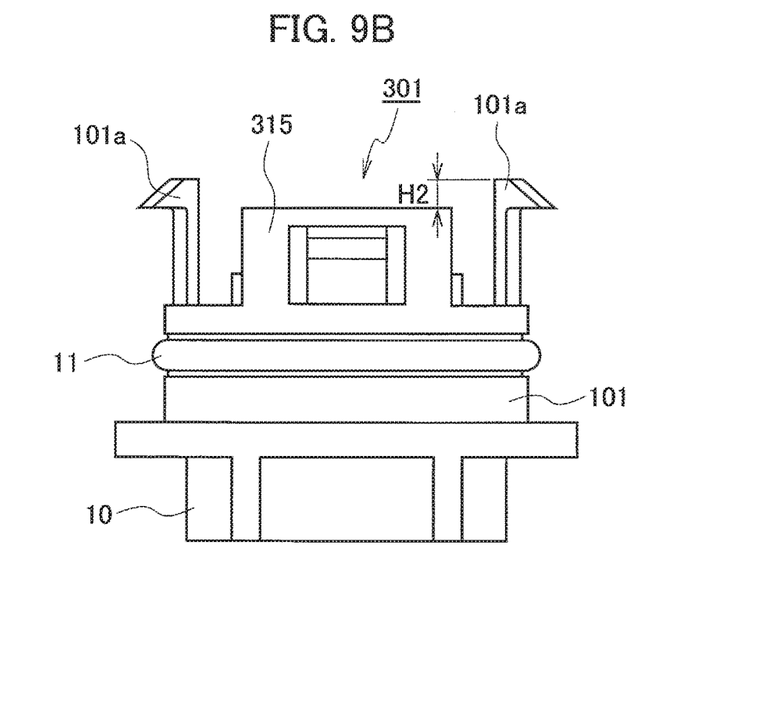
FIG. 9B is a side view showing a configuration example of a waterproof component according to the reference example.

By the way, the waterproof component 301 according to the reference example as shown in FIGS. 8 and 9B includes a housing body 10, an elastic ring (O-ring) 11, a mat seal 12, and a mat seal cover 13.

Then, the housing body 10 includes a locking claw 101a being inserted into an attachment hole 31 of a vehicle body panel, a housing 30 of a control device, or the like and being elastically deformable to be locked to a peripheral surface of the attachment hole 31.

The pair of locking claws 101a are disposed in positions facing each other at 180 degrees. Each locking claw 101a includes an elastic support wall 180 and a claw portion 181 provided at the tip of the elastic support wall 180. The tip of each claw portion 181 protrudes outward from the outer peripheral surface of the attachment hole insertion portion 101.

In addition, when attached to the attachment hole 31, the housing body 10 abuts on the inner wall of the attachment hole 31 to support the housing body 10. Furthermore, the housing body 10 is provided with cover locking portions 315 for locking the mat seal cover 13.

The pair of cover locking portions 315 are disposed in positions facing each other at 180 degrees. The outer peripheral surface of each cover locking portion 315 is flush with the outer peripheral surface of the attachment hole insertion portion 101. An engagement hole 317 is formed in each cover locking portion 315.

However, in the waterproof component 301 according to the reference example, as shown in FIG. 9B, the height of the cover locking portion 315 is lower by the height H2 than the locking claw 101a.

Figure 10A:
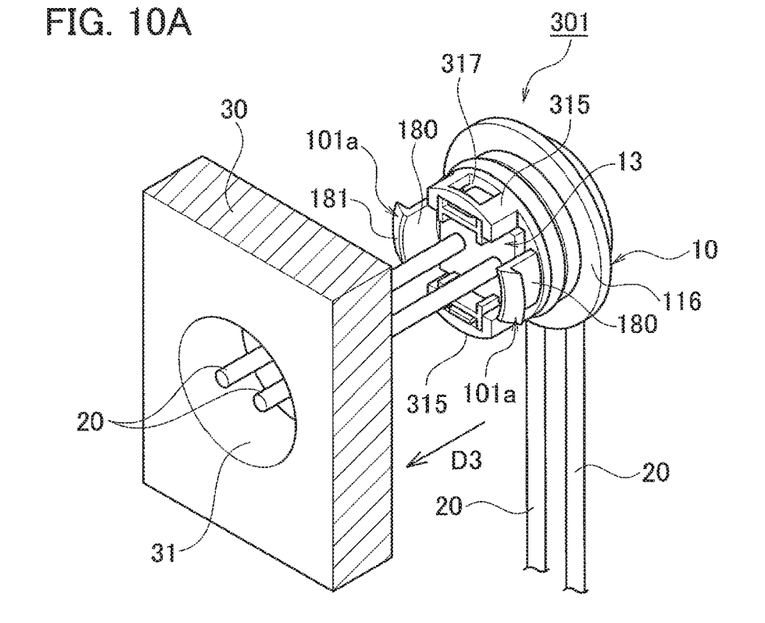
FIG. 10A is a perspective view showing a state of attaching the waterproof component according to the reference example to the wall portion.
Figure 10B:
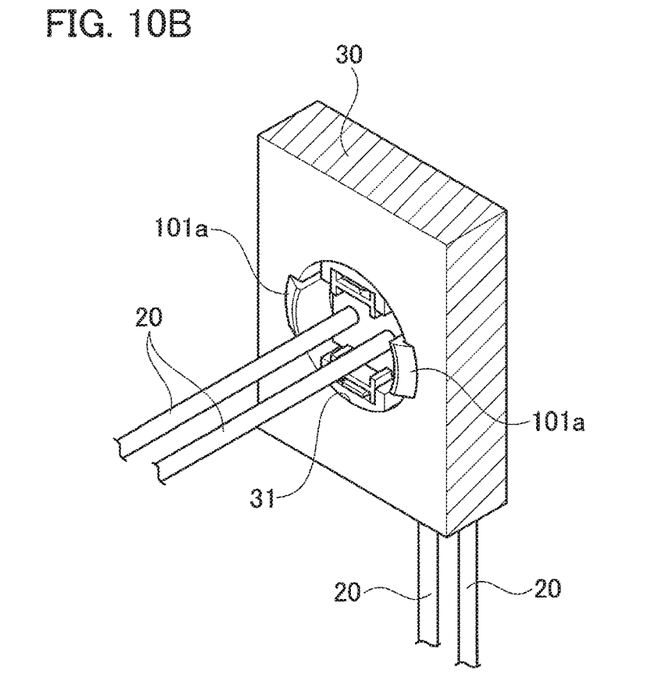
FIG. 10B is a perspective view showing a state after attachment in a process of attaching the waterproof component according to the reference example.
Figure 11A:
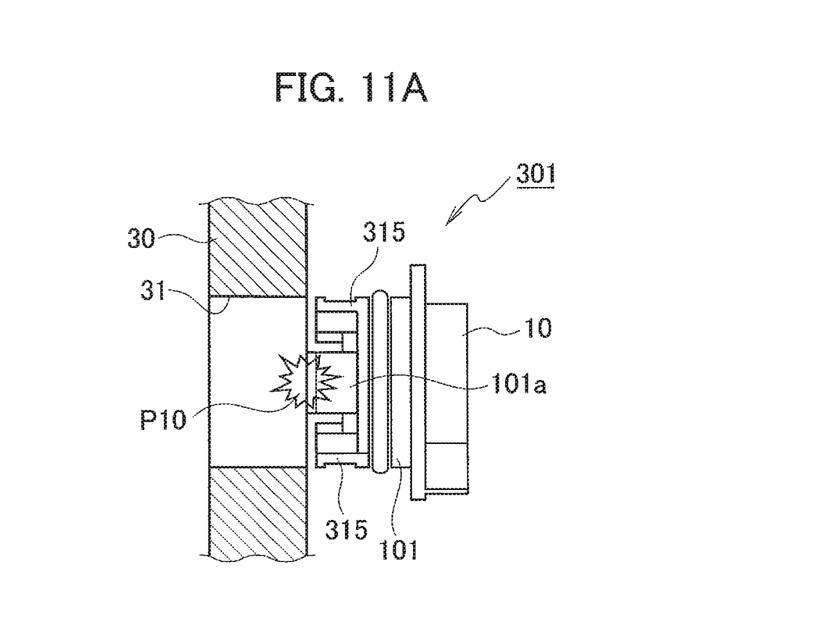
FIG. 11A is a side view showing a state of attaching the waterproof component according to the reference example to the wall portion.

For this reason, as shown in FIG. 10A, when the waterproof component 301 is pressed in the horizontal direction (D3 direction) toward the attachment hole 31, the tip surface of the locking claw 101a abuts on the peripheral portion of the attachment hole 31 before the cover locking portion 315 abuts as shown in FIG. 11A.

Figure 11B:
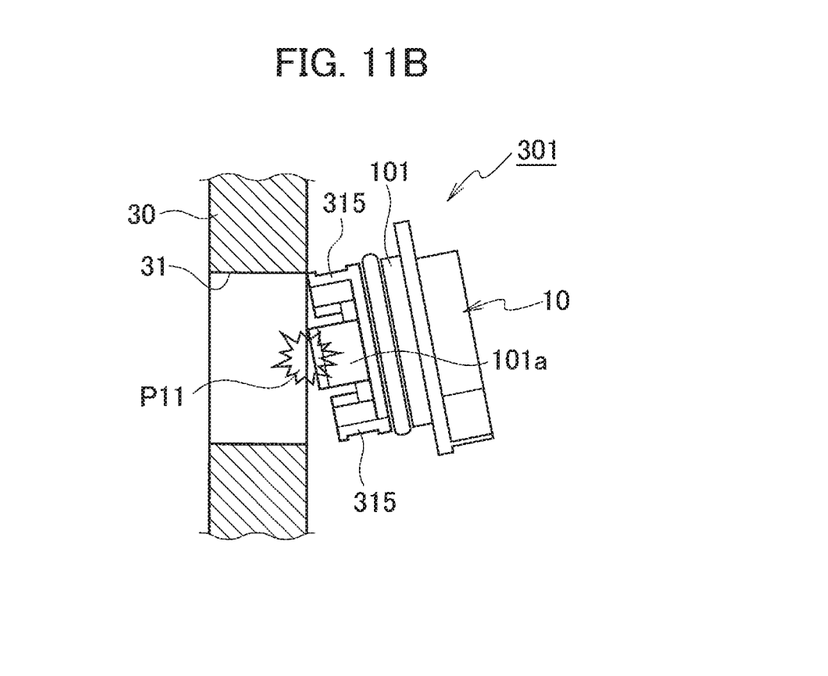
FIG. 11B is a side view showing a state of attaching the waterproof component according to the reference example to the wall portion.

In addition, when the waterproof component 301 is obliquely pressed toward the attachment hole 31, the corner portion of the locking claw 101a abuts on the peripheral portion of the attachment hole 31 before the cover locking portion 315 abuts as shown in FIG. 11B.

Therefore, when the elastic support wall 180 of the locking claw 101a is not elastically deformed with good timing, there is a problem that the locking claw 101a is lost or broken by buckling or the like due to collision with the peripheral portion of the attachment hole 31 in the abutting portions P10 and P11.

The present invention is made in view of the above problems, and has an object to provide a waterproof component capable of preventing the breakage of a locking claw.

A waterproof component according to an aspect of the present invention is configured to insert an electric wire into an attachment hole penetrating a wall portion to lock. The waterproof component includes a housing body, a mat seal, and a mat seal cover. The housing body includes an attachment hole insertion portion configured to be inserted into the attachment hole, the attachment hole insertion portion forming inside a mat seal accommodating chamber having a bottom wall, an abutting portion configured to abut a first peripheral surface of the attachment hole, a locking claw provided in an elastically deformable manner on an insertion tip side of the attachment hole insertion portion, the locking claw being configured to be locked to a second peripheral surface of the attachment hole opposite to the first peripheral surface, and a cover locking portion provided on an insertion tip side of the attachment hole insertion portion. The mat seal is accommodated in the mat seal accommodating chamber. The mat seal has an electric wire press-fitting hole through which an electric wire is to penetrate. The mat seal cover is locked to the cover locking portion. The mat seal cover interposes the mat seal between the mat seal cover and the bottom wall to hold the mat seal in the mat seal accommodating chamber. The cover locking portion protrudes from the locking claw in an insertion direction toward the attachment hole.

The waterproof component according to the aspect of the present invention provides a waterproof component capable of preventing the breakage of a locking claw.

DETAILED DESCRIPTION

A waterproof component 1 according to an embodiment of the present invention will be described with reference to FIGS. 1 to 7B.

(Configuration Example of Waterproof Component)

Figure 1:
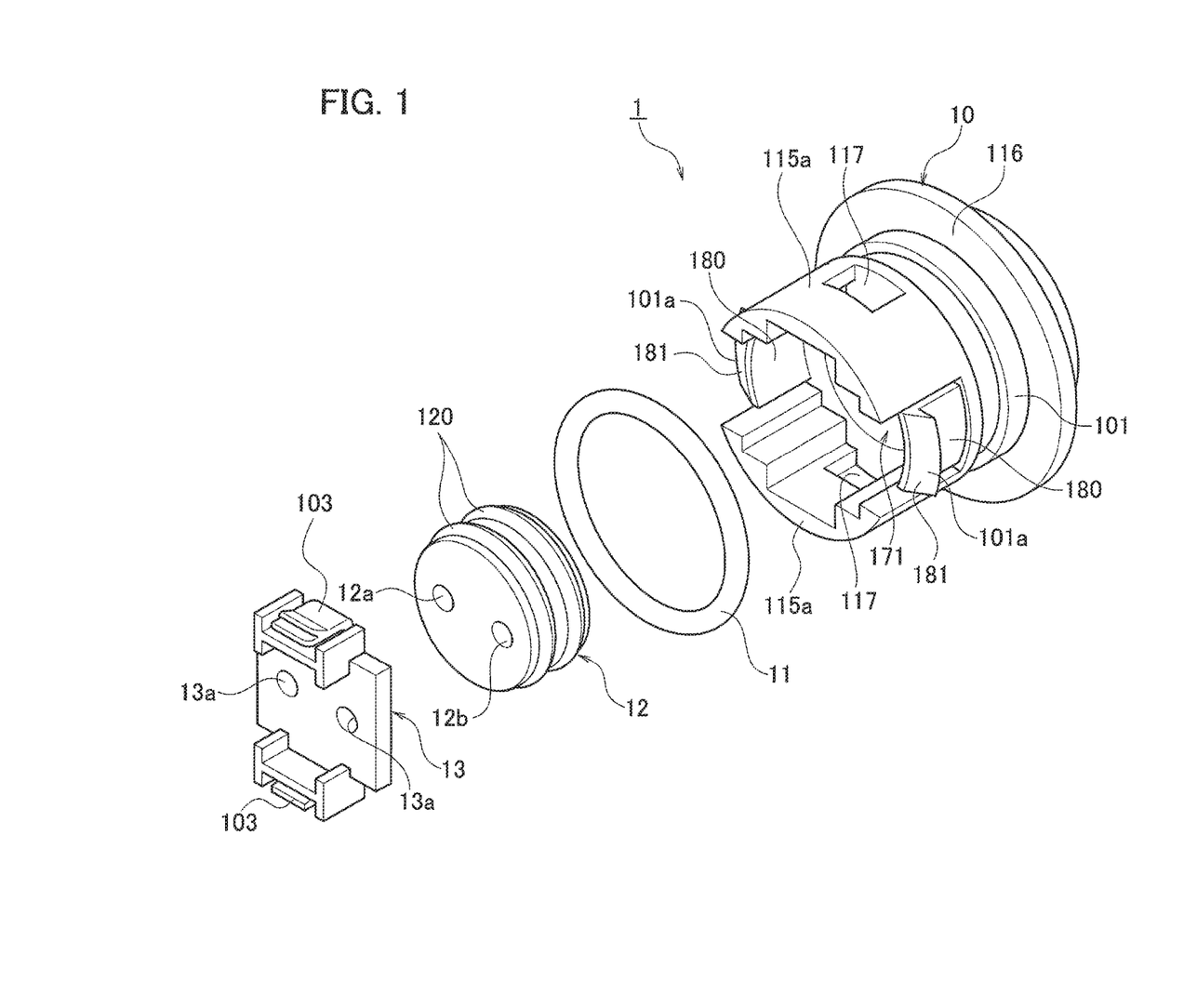
FIG. 1 is an exploded perspective view showing a configuration example of a waterproof component according to an embodiment.

The waterproof component 1 according to the embodiment of the present invention has a configuration as shown in FIG. 1 and the like.

Figure 2:
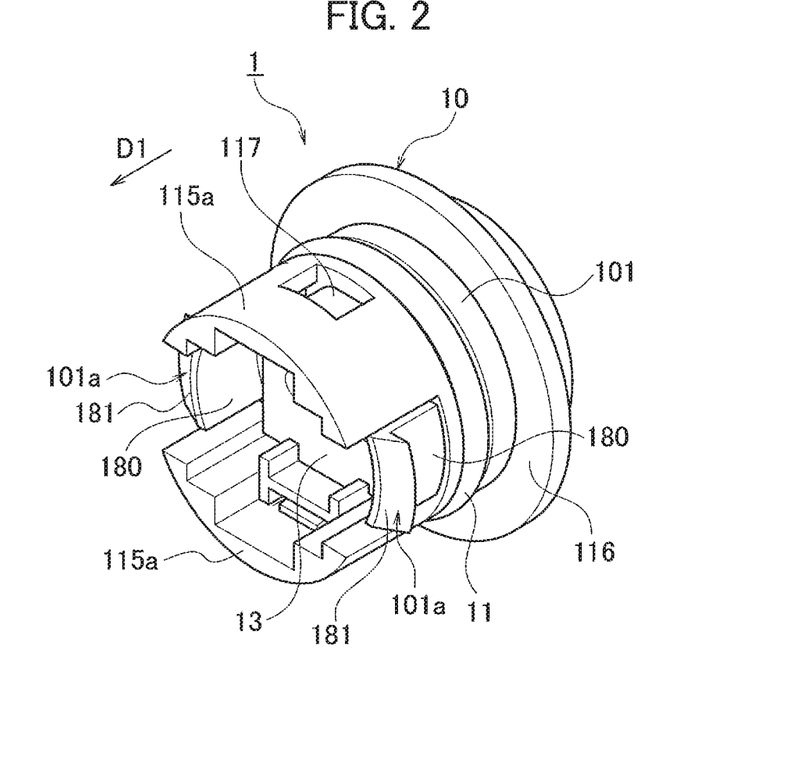
FIG. 2 is a perspective view showing the overall configuration of a waterproof component according to the embodiment.
Figure 3:
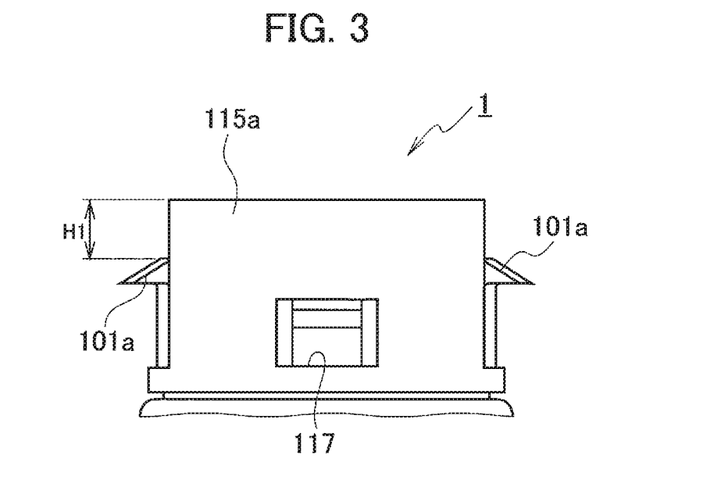
FIG. 3 is a side view showing a main part of a waterproof component according to the embodiment.
Figure 4A:
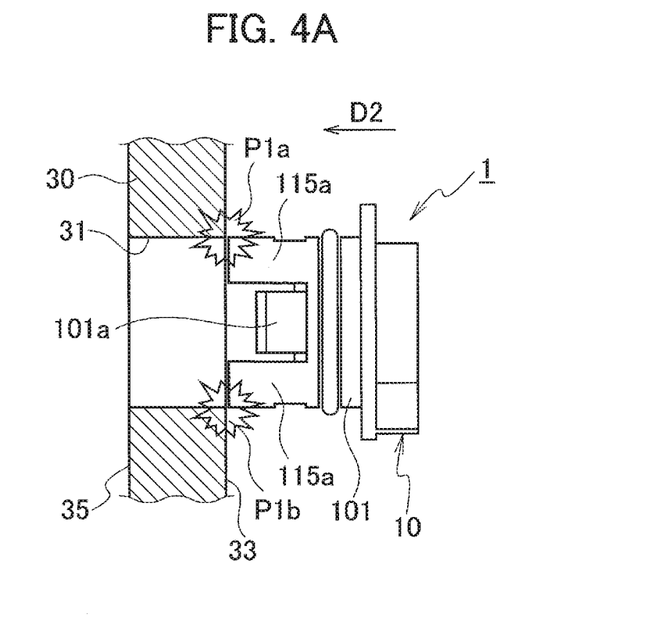
FIG. 4A is a side view showing a state of attaching the waterproof component according to the embodiment to the wall portion.
Figure 4B:
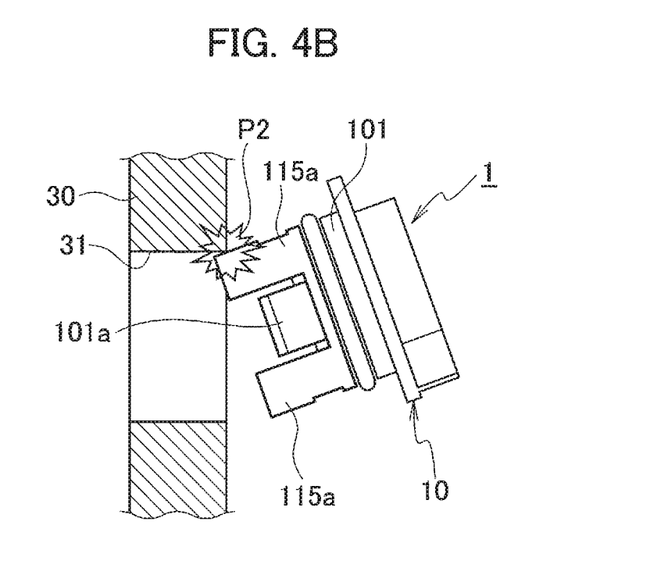
FIG. 4B is a side view showing a state of attaching the waterproof component according to the embodiment to the wall portion.
Figure 5:
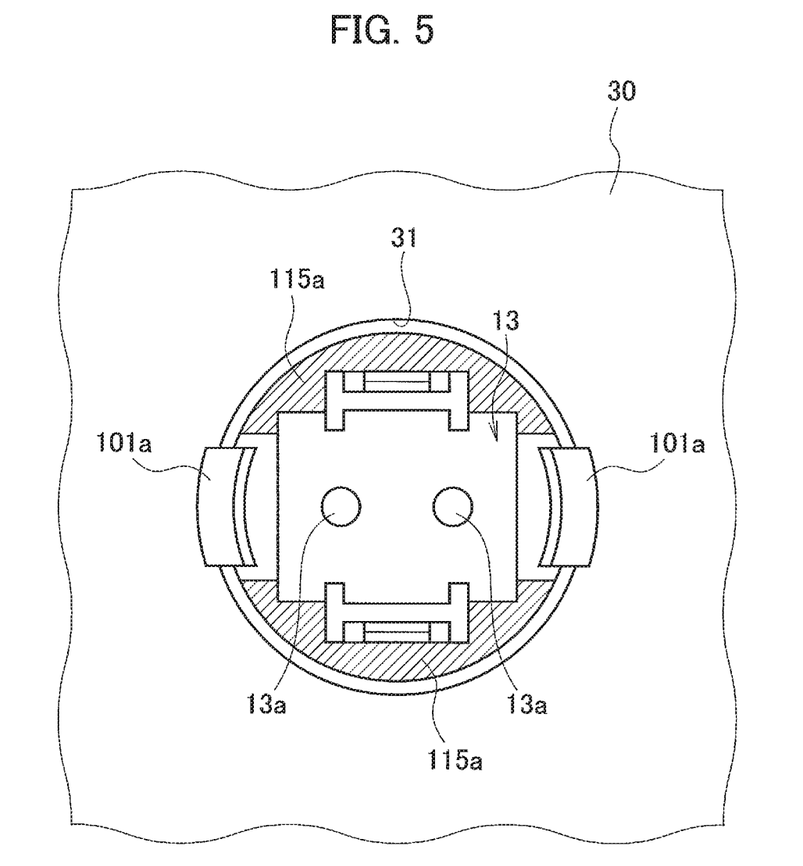
FIG. 5 is an front view showing a state after attachment in a process of attaching the waterproof component according to the embodiment to the wall portion.
Figure 6A:
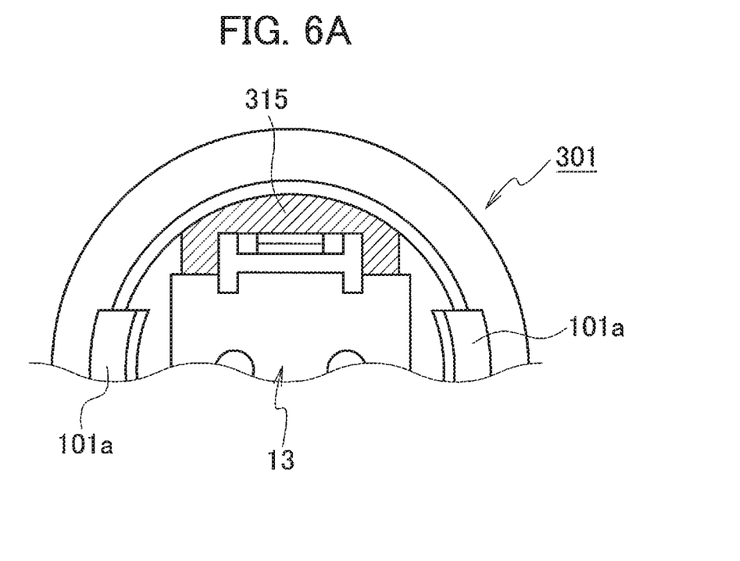
FIG. 6A is a partial enlarged view of a main part of a waterproof component according to a reference example.
Figure 6B:
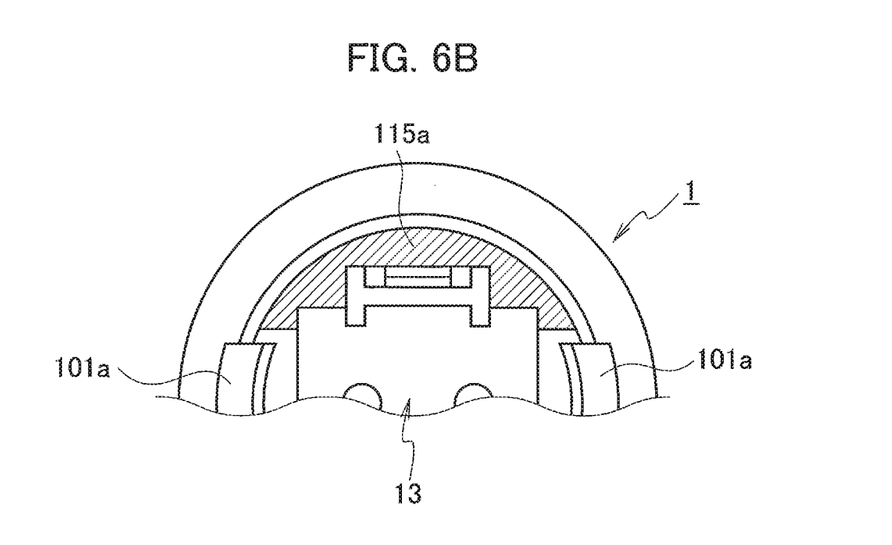
FIG. 6B is a partial enlarged view of a main part of the waterproof component according to the embodiment.
Figure 7A:
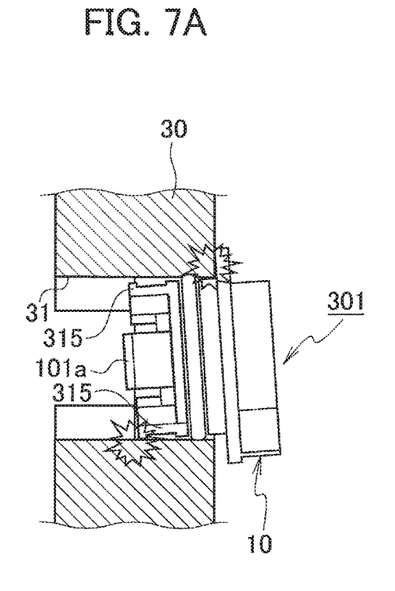
FIG. 7A is a side view showing a state of the waterproof component according to the reference example after attached to the wall portion.
Figure 7B:
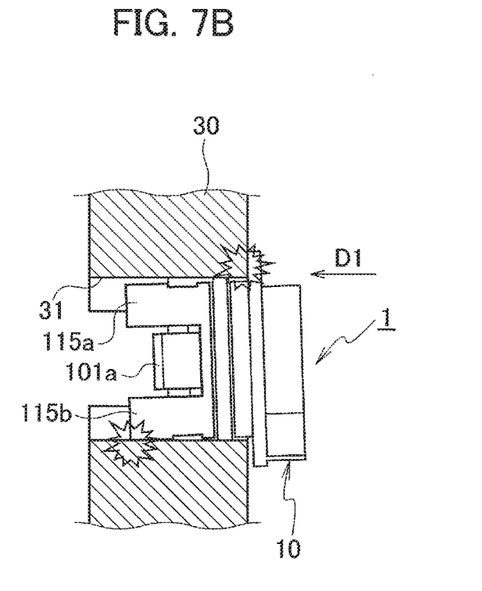
FIG. 7B is a side view showing a state of the waterproof component according to the embodiment after attached to the wall portion.

Here, FIG. 1 is an exploded perspective view showing a configuration example of the waterproof component 1 according to an embodiment; FIG. 2 is a perspective view showing the overall configuration of a waterproof component 1; FIG. 3 is a side view showing a main part of a waterproof component 1; FIGS. 4A and 4B are a side view showing a state of attaching the waterproof component 1 to the wall portion; FIG. 5 is an front view showing a state after attachment in a process of attaching the waterproof component 1 to the wall portion 30; FIG. 6A is a partial enlarged view of a main part of a waterproof component 301 according to a reference example; FIG. 6B is a partial enlarged view of a main part of the waterproof component 1 according to the embodiment; FIG. 7A is a side view showing a state of the waterproof component 301 according to the reference example after attached to the wall portion 30; and FIG. 7B is a side view showing a state of the waterproof component 1 according to the embodiment after attached to the wall portion 30.

As shown in FIGS. 4A, 4B and the like, a circular attachment hole 31 is formed in a wall portion 30 of a vehicle body panel, a control device, or the like. The attachment hole 31 is penetrated with electric wires 20. The electric wire 20 penetrates through the attachment hole 31, thereby being muted over the wet area on one side of the wall portion 30 and the waterproof area on the other side of the wall portion 30. An ECU and the like are disposed in one wet area, and various sensors and the like are disposed in the other waterproof area.

The electric wires 20 are equipped with the waterproof component 1. The attachment hole 31 of the wall portion 30 is filled with this waterproof component 1 (see FIG. 5).

As shown in FIG. 1 and the like, the waterproof component 1 includes a housing body 10, a mat seal 12, a mat seal cover 13, and an elastic ring (O ring) 11.

The housing body 10 includes an attachment hole insertion portion 101 inserted into the attachment hole 31, an abutting portion (flange portion) 116 provided on the insertion back end side of the attachment hole insertion portion 101, a pair of left and right locking claws 101a in the figure, and a pair of upper and lower cover locking portions 115a in the figure.

The attachment-hole-insertion portion 101 has substantially the same outer peripheral shape as the attachment hole 31. A mat seal accommodating chamber 171 having a bottom wall is formed inside the attachment hole insertion portion 101. Then, electric wire insertion holes through which the electric wires 20 can be inserted are formed in the bottom wall (not shown).

The abutting portion 116 has a larger diameter than the attachment hole 31. The abutting portion 116 abuts on the surface 33 on one side of the wall portion 30 of the attachment hole 31.

The pair of locking claws 101a are disposed in positions facing each other at 180 degrees. Each locking claw 101a includes an elastic support wall 180 and a claw portion 181 provided at the tip of the elastic support wall 180. The tip of each claw portion 181 protrudes outward from the outer peripheral surface of the attachment hole insertion portion 101. When inserting the mounting hole insertion portion 101 of the waterproof component 1 into the mounting hole 31, each locking claw 101a elastically deforms inward. When the claw portion 181 of the locking claw 101a reaches the back surface of the wall portion 30 to be exposed, each locking claw 101a returns to the original position and the claw portion 181 is locked to the peripheral edge surface 35 of the attachment hole 31.

The pair of cover locking portions 115a are disposed in positions facing each other at 180 degrees. The outer peripheral surface of each cover locking portion 115a is flush with the outer peripheral surface of the attachment hole insertion portion 101. An engagement hole 117 is formed in each cover locking portion 115a. The engagement hole 117 penetrates the inner peripheral surface and the outer peripheral surface of the cover locking portion 115a.

The mat seal 12 is made of an elastically deformable material and presents a disc shape. In the mat seal 12, two electric wire press-fitting holes 12a, 12b are formed in point symmetry positions centered on the center point. The electric wire 20 penetrates through each electric wire press-fitting hole 12a, 12b. The gap between the outer peripheral surface of each electric wire 20 and the electric wire press-fitting hole 12a, 12b of the mat seal 12 is waterproofed by compressive deformation of the mat seal 12.

Two lines of protrusions 120 are provided on the outer peripheral surface of the mat seal 12. The mat seal 12 is press-fitted into the mat seal accommodating chamber 171 with the two lines of protrusions 120 compressed and deformed.

As shown in FIG. 1 and the like, the mat seal cover 13 is made of an elastically deformable material. Then, the mat seal cover 13 is provided with a pair of upper and lower locking protrusions 103 in the figure. Each locking protrusion 103 is formed to be elastically deformable in the vertical direction.

The mat seal cover 13 is formed with insertion holes 13a through which the electric wires 20 are inserted. Each insertion hole 13a is formed in a position facing each electric wire press-fitting hole 12a, 12b of the mat seal 12. In each insertion hole 13a, an electric wire 20 penetrating the electric wire press-fitting hole 12a, 12b of the mat seal 12 is inserted.

Each locking protrusion 103 is fitted into the engagement hole 117 of the housing body 10 from the inside to be locked. Thus, the mat seal 12 is interposed between the mat seal cover 13 and the bottom wall (not shown) to be held in the mat seal accommodating chamber 171.

It should be noted that the rubber-made elastic ring (O ring) 11 is disposed on the outer periphery of the attachment hole insertion portion 101 of the housing body 10 to be brought into close contact with the inner peripheral surface of the attachment hole 31.

In addition, the number of the electric wires 20 is optional, and the number of the insertion holes of the mat seal 12 and the mat seal cover 13 is naturally changed in accordance with the number of the electric wires 20.

Here, in the waterproof component 1 according to the present embodiment, in the housing body 10, the cover locking portion 115a protrudes from the locking claw 101a in the insertion direction (D1 direction in FIG. 2) toward the attachment hole 31.

More specifically, as shown in FIG. 3, the height of the cover locking portion 115a is larger than that of the locking claw 101a by the height H1.

With this configuration, it is possible to avoid a situation where the locking claw 101a is broken due to collision with the periphery of the attachment hole 31.

That is, as shown in FIG. 4A, when the waterproof component 1 is pressed in the horizontal direction (D2 direction) toward the attachment hole 31, the cover locking portion 115a abuts on parts P1a and P1b of the peripheral portion of the attachment hole 31 before the tip surface of the locking claw 101a abuts.

In addition, when the waterproof component 1 is obliquely pressed toward the attachment hole 31, as shown in FIG. 4B, the cover locking portion 115a abuts on a part P2 of the peripheral portion of the attachment hole 31 before the corner of the locking claw 101a abuts.

Thus, since the locking claw 101a is protected by the cover locking portion 115a at the time of attachment, a situation in which the locking claw 101a is lost or broken by buckling and the like due to collision with the peripheral portion of the attachment hole 31 is avoided.

In addition, the cover locking portion 115a of the waterproof component 1 according to the present embodiment is configured to cover up to the vicinity of the locking claw 101a. Therefore, as shown in FIG. 5, with being attached to the attachment hole 31 of the wall portion 30 of the vehicle body panel or the like, the outer peripheral surface of the cover locking portion 115a is wider in the left and right direction than the cover locking portion 315 of the waterproof component 301 according to the reference example shown in FIG. 6A and the like. Thus, the cover locking portion 115a can also serve as the positioning function of the waterproof component 1 in the left and right direction, and the waterproof component 1 can be aligned more easily and reliably.

Furthermore, as shown in FIGS. 6A and 6B, with being attached to the attachment hole 31 of the wall portion 30 of the vehicle body panel or the like, the cover locking portion 115a of the waterproof component 1 according to the present embodiment has a larger area in contact with the inner wall of the attachment hole 31 than the cover locking portion 315 of the waterproof component 301 according to the reference example. Therefore, the backlash of the mat seal cover 13 supported by the cover locking portion 115a can be prevented.

It should be noted that, as shown in FIGS. 7A and 7B, in the attachment hole 31 of the wall portion 30 of the vehicle body panel or the like, when the peripheral portions of the attachment hole 31 positioned in the vertical direction have configurations extending in the insertion direction (D1 direction), with the waterproof component attached to the attachment hole 31, the cover locking portion 115a of the waterproof component 1 according to the present embodiment reaches the deeper side in the insertion direction (D1 direction) of the inner wall of the attachment hole 31 than the cover locking portion 315 of the waterproof component 301 according to the reference example. Therefore, with this configuration, the backlash of the waterproof component 1 can be prevented.

As described above, although the waterproof component of the present invention is described based on the illustrated embodiment, the present invention is not limited to this, and the configuration of each part can be replaced with any configuration having the same function.

For example, a plurality of (for example, three or more) locking claws 101a can be arranged at intervals, and each cover locking portion 115a can be arranged between adjacent locking claws.

What is claimed is:

1. A waterproof component configured to insert an electric wire into an attachment hole penetrating a wall portion to lock, the waterproof component comprising:
   a housing body including:
      an attachment hole insertion portion configured to be inserted into the attachment hole, the attachment hole insertion portion forming inside a mat seal accommodating chamber having a bottom wall;
      an abutting portion configured to abut a first peripheral surface of the attachment hole;
      a locking claw provided in an elastically deformable manner on an insertion tip side of the attachment hole insertion portion, the locking claw being configured to be locked to a second peripheral surface of the attachment hole opposite to the first peripheral surface; and
      a cover locking portion provided on an insertion tip side of the attachment hole insertion portion;
   a mat seal accommodated in the mat seal accommodating chamber, the mat seal having an electric wire press-fitting hole through which an electric wire is to penetrate; and
   a mat seal cover locked to the cover locking portion, the mat seal cover interposing the mat seal between the mat seal cover and the bottom wall to hold the mat seal in the mat seal accommodating chamber,
   wherein the cover locking portion protrudes from the locking claw in an insertion direction toward the attachment hole.

2. The waterproof component according to claim 1, wherein
   a plurality of the locking claws are arranged at intervals, and
   each of the cover locking portion is arranged between the locking claws being adjacent.

* * * * *